UNITED STATES PATENT OFFICE.

BENNO HOMOLKA, OF FRANKFORT-ON-THE-MAIN, AND RICHARD WELDE, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MAKING METHYLTHIOPHENOL-ORTHO-CARBOXYLIC ACID.

No. 889,010.     Specification of Letters Patent.     Patented May 26, 1908.

Application filed February 5, 1907. Serial No. 355,873. (Specimens.)

*To all whom it may concern:*

Be it known that we, BENNO HOMOLKA, Ph. D., and RICHARD WELDE, Ph. D., chemists, citizens of the Empire of Germany, and residing at Frankfort-on-the-Main and Höchst-on-the-Main, Germany, respectively, have invented certain new and useful Improvements in Making Methylthiophenol-Ortho-Carboxylic Acids, of which the following is a specification.

We have found that methylthiophenol-ortho-carboxylic acids having the general formula:—

wherein "R" means an aromatic residue may be obtained if methylating substances are allowed to act on alkaline solutions of thiophenol-ortho-carboxylic acids having the general formula:—

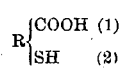

wherein "R" means an aromatic residue. It is not necessary, however, to use the thiophenol-ortho-carboxylic acids in a finished form; the parent material may be the product of the reaction of diazotized ortho-aminobenzoic acids on soluble metal sulfids or sulfhydrates or it may be an ethereal compound or ether-like compounds of thiophenol-ortho-carboxylic acids, such, for instance, as the readily obtainable ethereal thio-carbonates (xanthogenates) having the general formula:—

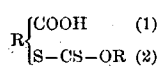

Wherein "R" means an alkyl, and "R'" an aromatic residue or it may be thio-cyanogen compounds having the general formula:—

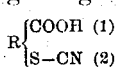

wherein "R" means an aromatic residue or disulfids having the general formula:—

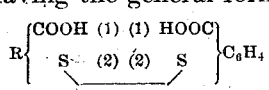

wherein "R" means an aromatic residue.

As methylating agents may be used the methylhalids or the normal or acid methyl sulfate.

The process may be carried out, for instance, as follows:—

Example I. 154 parts by weight of thiosalicylic acid are dissolved in 400 parts by weight of soda-lye of 27° Bé. specific gravity, 200 parts by weight of dimethyl sulfate being stirred in a closed vessel without access of air. The reaction is complete after several hours at ordinary temperature according to the following equation:

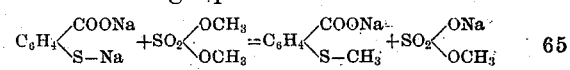

It is preferable to expel the methyl methylthiophenol-ortho-carboxylate by means of steam and to precipitate from the residue the methylthiophenol-ortho-carboxylic acid by adding hydrochloric acid. By heating the methyl methylthiophenol-ortho-carboxylate with aqueous caustic alkalies and by subsequently precipitating by adding a mineral acid, the free methylthiophenol-ortho-carboxylic acid may be obtained in the form of white flakes soluble in water with great difficulty. The acid is readily soluble in hot alcohol and hot acetic acid and separates as crystals from the hot saturated solutions on cooling. It melts at 168—169° C.

Example II. The solution of ortho-diazobenzoic acid, obtained by diazotizing 139 parts of anthranilic acid, of 98.3 per cent. strength, is slowly run into a solution of 250 parts by weight of sodium sulfid ($Na_2S9aq$) and 300 parts by weight of sodium methyl sulfate of 46 per cent. strength, preferably after neutralization with sodium carbonate, while stirring, at 60—70° C., the whole being finally heated for some time to ebullition. The methylthiophenol-ortho-carboxylic acid is isolated from the product of reaction by precipitating by addition of a mineral acid; it may be purified by recrystallization.

Example III. 242 parts by weight of an ethereal thio-carbonate of benzoic acid together with 125 parts by weight of caustic alkali (90 per cent. strength) are dissolved in about 800 parts of alcohol (70 per cent. strength), and 300 parts by weight of methyl iodid or the equivalent quantity of another methyl halid are added, the whole being heated to about 90—100° C. for some hours. The volatile products are then distilled away and the ethereal methylthiophenol-orthocarboxylate is driven over with steam. Analogous to Example I the methylthio-phenol-ortho-carboxylic acid is obtained by hydrolysis.

Example IV. 179 parts by weight of ortho-thiocyano-benzoic acid are heated for about three hours in a reflux apparatus with 600 parts by weight of soda-lye of 27° Bé. specific gravity and 585 parts by weight of sodium methylsulfate (of 46 per cent. strength). The methylthiophenol-ortho-carboxylic acid is isolated by acidifying with a mineral acid and is purified, if necessary, by re-crystallization.

Example V. 15.3 parts by weight of phenyldithio-ortho-ortho-dicarboxylic acid, 8.0 parts by weight of caustic soda and 58 parts by weight of sodium methylsulfate (of 46 per cent. strength) are dissolved in 40—50 parts of water and the solution is heated to ebullition in a reflux apparatus for about 5 hours. Small quantities of methyl-methyl-thiophenol-ortho-carboxylate are distilled from the product by steam, and from the residue the methylthiophenol-ortho-carboxylic acid is precipitated by adding a dilute mineral acid.

According to the methods indicated in Examples I—V substituted methylthiophenol-ortho-carboxylic acids may also be obtained; for instance, such as have other elements (Cl, Br) or groups (OH, SH, $OCH_3$, $OC_2H_3$, $CH_3$, $SCH_3$, $SC_2H_5$, etc.,) substituted for hydrogen in the aromatic nucleus. All these compounds behave very similarly in their physical and chemical properties. These ortho-carboxylic acids are characterized by yielding alpha-oxythionaphthens when heated with alkaline condensing agents, and red dyestuffs when heated with fuming sulfuric acid.

Having now described our invention, what we claim is:—

1. As a new product, the methylthiophenol-o-carboxylic acid having the general formula:

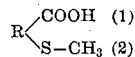

wherein "R" means an aromatic residue and wherein the hydrogen-atom of the carboxylic group may be replaced by an alkyl radical, being colorless, soluble in alkalies, little soluble in water, readily soluble in alcohol, methyl alcohol and glacial acetic acid, yielding, when heated with alkaline condensing agents, alpha-oxy-thionaphthene and a dyestuff when heated with fuming sulfuric acid.

2. The process of making methylthiophenol-o-carboxylic acids, as set forth, which consists in causing methylating agents to act on alkaline solutions of thiophenol-o-carboxylic acids having the general formula:

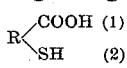

wherein "R" means an aromatic residue and wherein the hydrogen atom of the carboxylic group may be replaced by an alkyl radical.

In testimony, that we claim the foregoing as our invention, we have signed our names in presence of two subscribing witnesses.

BENNO HOMOLKA.
RICHARD WELDE.

Witnesses:
JEAN GRUND,
CARL GRUND.